United States Patent [19]

Sorensen et al.

[11] Patent Number: 5,722,259
[45] Date of Patent: Mar. 3, 1998

[54] COMBUSTION TURBINE AND ELEVATED PRESSURE AIR SEPARATION SYSTEM WITH ARGON RECOVERY

[75] Inventors: James Christian Sorensen, Allentown; Rakesh Agrawal, Emmaus; Arthur Ramsden Smith, Telford; Steven Lawrence Feldman, Macungie; Donald Winston Woodward, New Tripoli, all of Pa.

[73] Assignee: Air Products and Chemicals, Inc., Allentown, Pa.

[21] Appl. No.: 615,665

[22] Filed: Mar. 13, 1996

[51] Int. Cl.⁶ ........................................ F25J 3/00
[52] U.S. Cl. .................. 62/646; 62/915; 60/39.12
[58] Field of Search ................ 62/646, 915; 60/39.12

[56] References Cited

U.S. PATENT DOCUMENTS

| | | | |
|---|---|---|---|
| 4,224,045 | 9/1980 | Olszewski et al. | 62/30 |
| 5,114,449 | 5/1992 | Agrawal et al. | 62/22 |
| 5,165,245 | 11/1992 | Agrawal et al. | 62/38 |
| 5,245,831 | 9/1993 | Agrawal et al. | 62/22 |
| 5,255,522 | 10/1993 | Agrawal et al. | 62/22 |
| 5,255,524 | 10/1993 | Agrawal et al. | 62/22 |
| 5,421,166 | 6/1995 | Allam et al. | 62/24 |

Primary Examiner—Ronald C. Capossela
Attorney, Agent, or Firm—John M. Fernbacher

[57] ABSTRACT

An integrated gasification combined cycle (IGCC) power generation system is operated with a cryogenic air separation system which produces oxygen used in a gasification system to produce fuel gas for the IGCC combustion turbine and pressurized nitrogen which is introduced into the combustor for control of nitrogen oxides and increased combustion turbine output. The air separation system produces argon as an additional product, and the air separation system preferably operates in the feed pressure range of about 100 to about 160 psia. The compressed air feed for the air separation system and the compressed combustion air for the IGCC system are provided independently in separate compression steps.

15 Claims, 6 Drawing Sheets

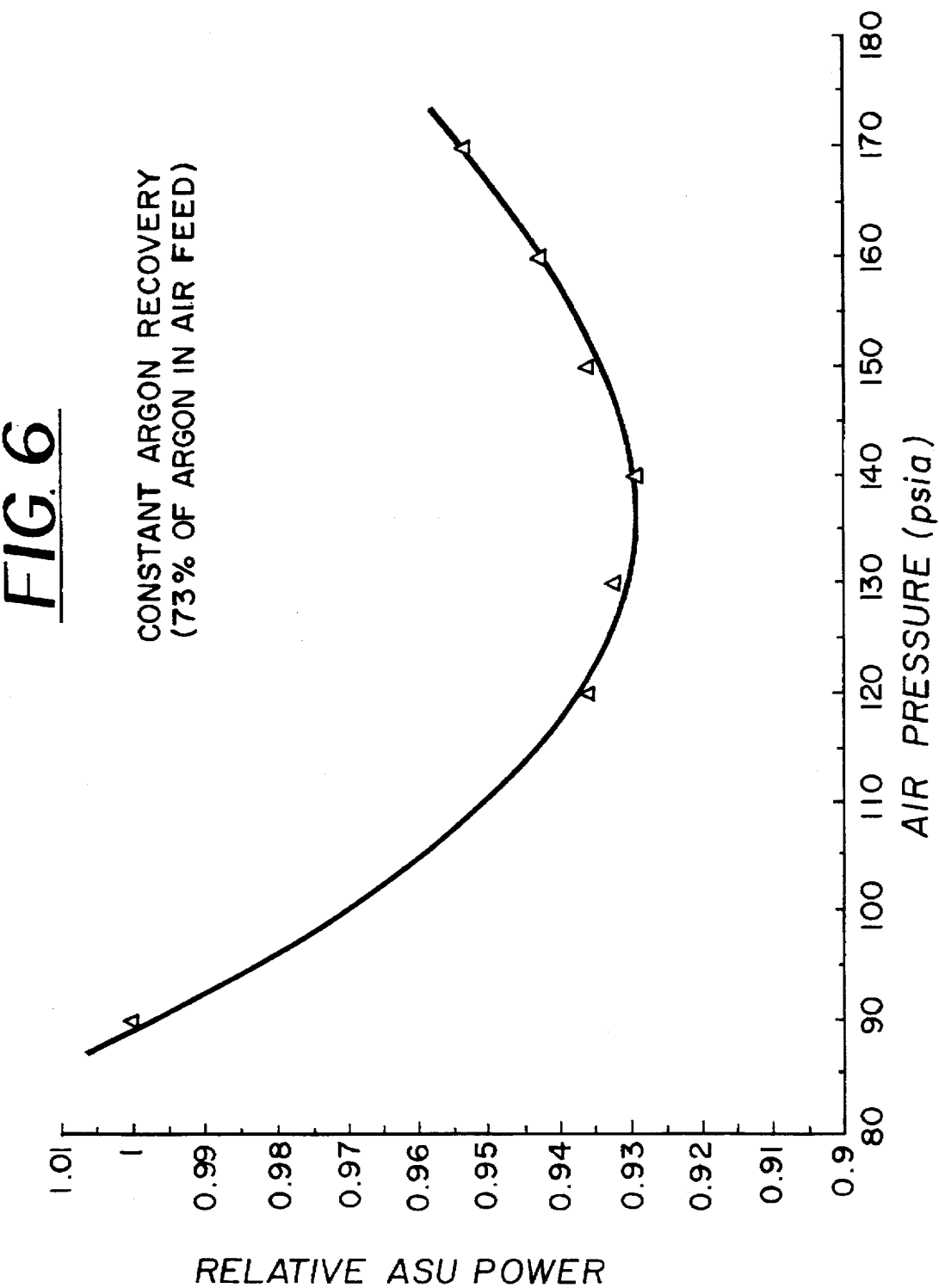

COMBUSTION TURBINE AND ELEVATED PRESSURE AIR SEPARATION SYSTEM WITH ARGON RECOVERY

TECHNICAL FIELD OF THE INVENTION

This invention pertains to the recovery of argon in a cryogenic air separation system at elevated pressure, and in particular to the integration of such a cryogenic air separation system with an integrated gasification combined cycle power generation system.

BACKGROUND OF THE INVENTION

Combustion turbines are readily integrated with air separation systems to produce atmospheric gas products and electric power. The combustion turbine air compressor supplies compressed air for the turbine combustor and also may provide some or all of the compressed air feed to the air separation system. Typically the combustion turbine is integrated with a cryogenic air separation system designed specifically for such integration, and the combustion turbine and air separation systems can be integrated further with a gasification process in an integrated gasification combined cycle (IGCC) power generation system. Nitrogen and oxygen products from the cryogenic air separation system are used directly in the IGCC system in most applications. Argon is a valuable gas product which can be recovered in combination with oxygen and/or nitrogen in a cryogenic air separation system specifically designed for this purpose. In selected applications it is desirable to recover argon in a cryogenic air separation process which is integrated with an IGCC system.

U.S. Pat. Nos. 5,245,831, 5,255,522, and 5,255,524 describe elevated pressure air separation cycles with argon recovery which operate at feed pressures above 100 psia. When these cycles are integrated with an IGCC system, some or all of the feed air to the air separation system is provided as a portion of the compressed air from the combustion turbine air compressor. These modes of operation are known as partial or full air integration respectively, and the air supplied to the air separation system from the combustion turbine air compressor is commonly known as extracted air. In addition, some or all of the nitrogen product is returned to the combustion turbine, a mode of operation commonly known as nitrogen integration. A portion of the argon column overhead vapor is condensed against a vaporizing liquid such as oxygen from the low pressure column, nitrogen from the high pressure column, or a portion condensed air feed to the high pressure column. The efficiency of argon production from these elevated pressure air separation cycles is enhanced by utilizing heat pump techniques utilizing the recirculation of the fluid which is used for condensing a portion of the argon column overhead vapor, and by integrating the argon column condenser with a specific location in the low pressure column.

U.S. Pat. No. 5,165,245 teaches elevated pressure air separation cycles with argon recovery wherein a portion of the nitrogen product is expanded to low pressure. The air separation cycles as described are not integrated with a system. U.S. Pat. No. 5,421,166 discloses an elevated pressure air separation cycle having nitrogen integration with an IGCC system, but does not include argon recovery. Oxygen product is provided at low purity, e.g. 93 to 98 vol %. U.S. Pat. No. 4,224,045 teaches an elevated pressure air separation system integrated with an IGCC system with both air and nitrogen integration but again without argon recovery. The prior art also includes many well-known examples of pumped LOX cycles and mixing column cycles in the literature which produce elevated pressure O2 but not elevated pressure N2.

The design of a cryogenic air separation process for both argon recovery and integration with an IGCC system must take into account potentially conflicting design requirements. Among these design requirements are the operating pressures of the multiple distillation columns used in cryogenic air separation relative to the operating pressures of the gasification process and combustion turbines used in systems. The trend toward the integration of air separation processes with IGCC systems operating at higher pressures makes the recovery of argon more difficult, because the key argon-oxygen separation becomes more difficult at higher pressures. Additional design requirements typically include returning nitrogen from the air separation process to the gas turbine to icrease power output and control generation of nitrogen oxides, and providing compressed air feed for the air separation system partially or completely from the combustion turbine air compressor as described in the prior art summarized above. In addition, the argon product typically is provided to an external user, while the oxygen and/or nitrogen products are provided for use in the system. The product demand profile for argon will be different than that for oxygen and nitrogen, because the demand for IGCC power (and thus for oxygen and nitrogen used in the IGCC system) typically varies with ambient conditions and the time of day, while the demand for argon product follows a different demand profile.

To address these design and operational requirements, there is a need to develop optimum cycles and operating conditions for air separation processes with argon recovery which are integrated with IGCC systems. The invention disclosed below and defined in the claims which follow offers an improved method for the integration of IGCC systems with air separation processes including argon recovery.

SUMMARY OF THE INVENTION

In a known process for the generation of power in an integrated gasification combined cycle power generation system, a compressed air feed is separated in a cryogenic distillation system at elevated pressure to recover oxygen and nitrogen, and some or all of the oxygen is used in the gasification of a carbonaceous feedstock to provide a combustible gas mixture. Some or all of the gas mixture is combusted with compressed combustion air in a gas turbine combustor to generate hot pressurized gas which is expanded in a gas turbine to drive an electric generator to generate electric power. Optionally some or all of the nitrogen is introduced directly into the gas turbine combustor or combined with the combustible gas prior to the gas turbine combustor.

The improvement of the present invention comprises recovering an argon product in combination with the recovery of oxygen and nitrogen, wherein the compressed air feed for the cryogenic distillation system and the compressed combustion air for the gas turbine combustor are supplied by separate compression steps. Preferably, the compressed air feed for the cryogenic distillation system is provided at a pressure above about 100 psia and below about 180 psia. More preferably, the compressed air feed is provided in the range of about 120 psia to about 160 psia and most preferably between about 120 and about 150 psia. Argon recovery is at least 30%, preferably 50%, based on the compressed air feed to the cryogenic distillation system.

The oxygen and the argon products are recovered in a multiple column distillation process which comprises cooling the compressed air feed and separating the resulting cooled feed in a higher pressure column to yield a bottoms stream enriched in oxygen and argon; cooling the bottoms stream, reducing the pressure of the resulting cooled stream, and introducing the resulting cooled reduced pressure stream into a lower pressure column; withdrawing a high purity oxygen product from the bottom of the lower pressure column and an argon-enriched vapor from an intermediate point in the lower pressure column. The argon-enriched vapor is introduced into an argon recovery distillation column, a further enriched overhead vapor is withdrawn therefrom and condensed, a portion of the resulting condensate is utilized as reflux for the column, and the remaining portion of the condensate withdrawn as an enriched argon product. At least a portion of the cooling for condensing the overhead vapor of the argon recovery column is achieved by indirect heat transfer with fluid from an intermediate point in the lower pressure column.

In one embodiment of the invention, the lower pressure and higher pressure columns and the argon recovery column are thermally integrated by condensing a nitrogen overhead vapor from the higher pressure column against liquid oxygen boiling in the bottom of the lower pressure column, using a portion of the resulting condensed nitrogen as reflux in the higher pressure column, and using another portion of the resulting condensed nitrogen to provide by indirect heat exchange a portion of the cooling duty for condensing the overhead vapor from the argon recovery column, thereby yielding a partially warmed nitrogen stream. A nitrogen vapor product is withdrawn from the top of the lower pressure column and warmed typically to near ambient temperature. Preferably, some or all of this warmed nitrogen product is compressed and introduced directly into the gas turbine combustor or combined with the combustible gas prior to the gas turbine combustor.

The argon recovery can be increased by withdrawing a portion of the pressurized nitrogen stream prior to the gas turbine combustor, cooling the stream, and introducing the resulting cooled pressurized nitrogen stream into the higher pressure column. Alternatively, the resulting warmed nitrogen vapor product is compressed in at least two stages of compression to provide the pressurized nitrogen stream, and the partially warmed nitrogen stream obtained from the indirect cooling and condensing of the overhead from the argon recovery column is further warmed and combined with the warmed nitrogen vapor product between the two stages of compression to provide the resulting warmed compressed nitrogen stream prior to cooling and introduction into the higher pressure column.

In an alternative mode of operation, the partially warmed nitrogen stream obtained from the indirect cooling and condensing of the overhead from the argon recovery column is warmed, compressed, cooled, and introduced into the higher pressure column.

High purity oxygen product is withdrawn from the bottom of the lower pressure column as a liquid, the liquid is pumped to yield pressurized liquid oxygen, and the pressurized liquid oxygen is warmed, vaporized, and optionally further compressed to provide a high purity pressurized oxygen gas product.

Optionally, the purity of the high purity pressurized oxygen gas product is reduced by blending the high purity oxygen product prior to vaporization with a stream having a lower oxygen concentration. The stream having a lower oxygen concentration can be a portion of the bottoms stream from the higher pressure column, and blending is carried out either before or after pumping. Alternatively, the stream having a lower oxygen concentration is a portion of the cooled feed air prior to the higher pressure column, and blending is carried out following pumping.

BRIEF DESCRIPTION OF THE DRAWINGS

FIG. 6 is a plot of the relative air separation unit (ASU) power vs. feed air pressure for several ASU cycles at constant argon recovery.

DETAILED DESCRIPTION OF THE INVENTION

The present invention is an improved method for the integration of IGCC systems with air separation processes including argon recovery. As described herein, the invention allows improved efficiency for argon recovery in addition to the recovery of oxygen and nitrogen while operating an air separation system integrated with an IGCC system for the production of electric power.

Figure 1:
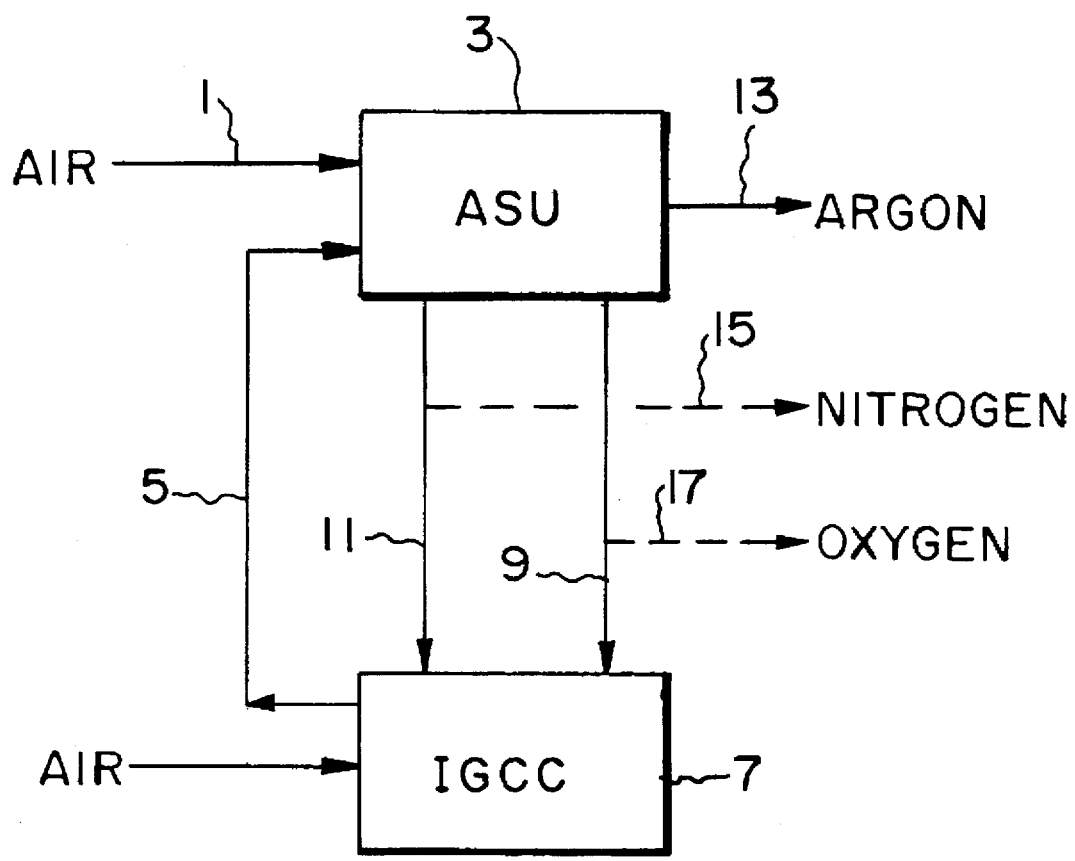
FIG. 1 is a schematic diagram showing the generic integration of an air separation process with an integrated gasification combined cycle (IGCC) system.

FIG. 1 is a generic illustration of prior art teaching on the integration of an air separation system including argon production with an IGCC system. Air 1 may be compressed and purified to remove condensable contaminants within air separation unit (ASU) 3 to provide a portion the necessary air feed to the ASU distillation process. The remainder of the compressed air feed for purification is supplied as compressed air 5 from the combustion turbine compressor of IGCC system 7 in the mode known as partial air integration. Alternatively, all air to the ASU is supplied as compressed air 5 and no additional air 1 is compressed in the ASU; this mode is known as full air integration. ASU 3 typically is further integrated with IGCC system 7 by supplying product oxygen 9 and/or product nitrogen 11 for use therein. Argon product 13, and optionally nitrogen and oxygen export products 15 and 17, are withdrawn from the ASU. Power to operate the feed and/or product compressors of the ASU may be provided as a portion of the power generated by the IGCC system. Thus the prior art requires partial or full air integration when operating an ASU with argon recovery integrated with an IGCC system.

The present invention is based on the realization that all feed air to ASU 3 should be supplied by compressing air 1 in a dedicated ASU main feed air compressor, and accordingly that extracted air 5 from IGCC system 7 is not utilized for feed air in ASU 3. Further, as described in detail below, the feed air pressure to the higher pressure column in ASU 3 preferably is below the IGCC combustion turbine air compressor discharge pressure. The feed air pressure to the higher pressure column is generally at a pressure above about 100 psia and below about 180 psia. More preferably, the compressed air feed is provided in the range of about 120 psia to about 160 psia to minimize the ASU power requirements. Most preferably, this pressure range is from about 120 to 150 psia. An integrated air separation/process of the present invention can utilize selected known cycles for air separation with argon recovery as described below.

Figure 2:
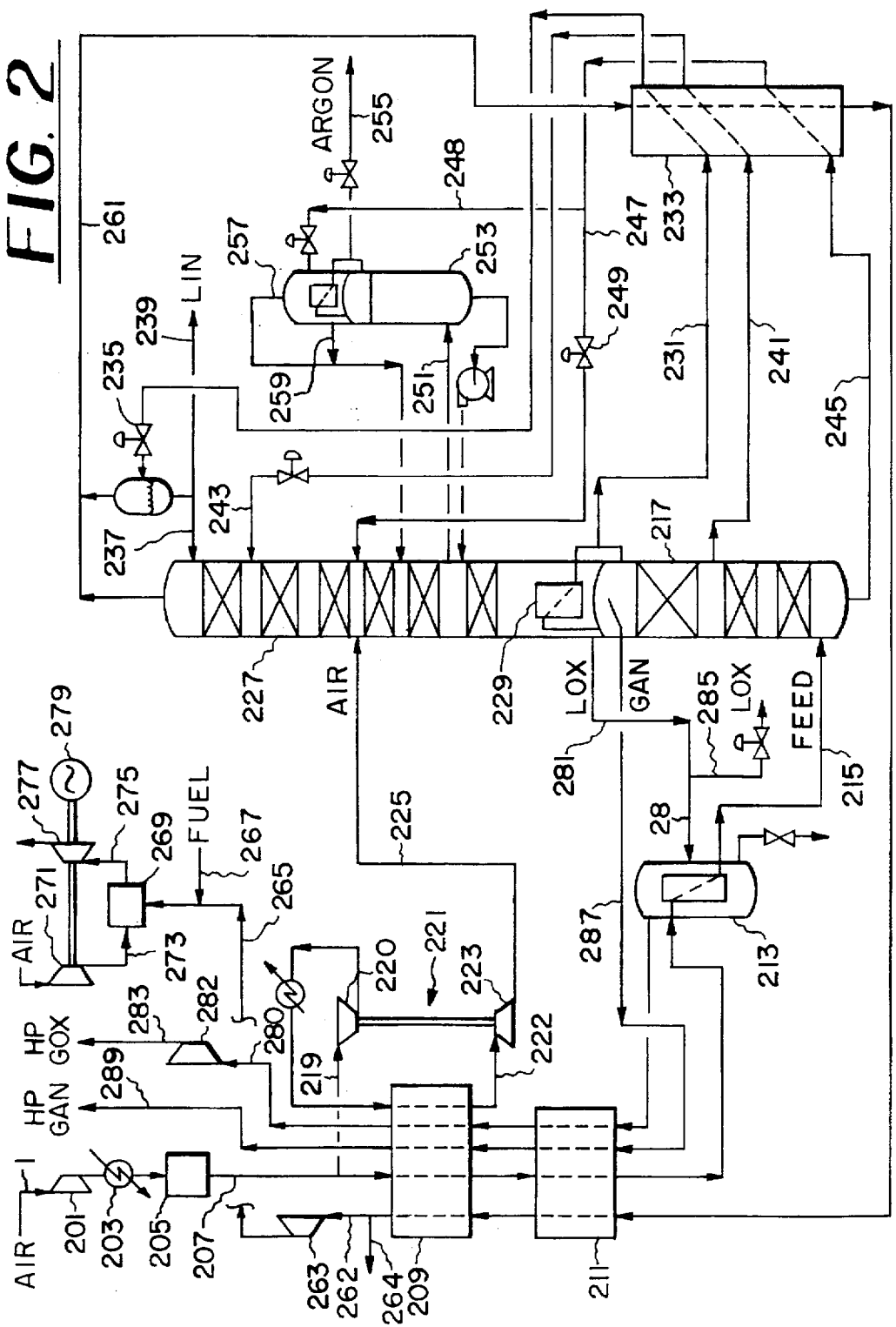
FIG. 2 is an air separation system with argon recovery integrated with an IGCC system.

One embodiment of the invention is illustrated in FIG. 2 which utilizes a standard air separation cycle with argon recovery. Air 1 is compressed in main air compressor 201, cooled in cooler 203, and purified by known methods in purification system 205 to remove condensible contaminants. A portion 207 of compressed air is cooled in exchangers 209 and 211, and is further cooled against boiling liquid oxygen product in reboiler-condenser 213. Final cooled air feed 215 is introduced into higher pressure distillation column 217.

Refrigeration for the air separation system is provided by further compressing additional portion 219 of purified compressed air in compressor 220 of compander 221, cooling the compressed stream, expanding cooled stream 222 in expansion turbine 223 of compander 221, and introducing cooled air 225 into lower pressure column 227. Alternative methods of refrigeration may be utilized if desired, such as for example the well-known waste expander cycle. Higher pressure column 217 and lower pressure column 227 are thermally linked in a known manner by reboiler-condenser 229 which condenses nitrogen overhead from higher pressure column 217 against boiling liquid oxygen in the bottom of lower pressure column 227 to provide reflux for the higher pressure column and boilup for the lower pressure column. A portion 231 of the higher pressure column overhead condensate is cooled exchanger 233 and flashed across throttling valve 235 to provide reflux 237 for lower pressure column 227 and optionally liquid nitrogen product 239. Optionally, intermediate stream 241 from higher pressure column 217 is cooled in exchanger 233, flashed, and introduced as intermediate feed 243 to lower pressure column 227. Crude liquid oxygen 245 is withdrawn from higher pressure column 217, cooled in exchanger 233, and portion 247 is flashed across throttling valve 249 and introduced into lower pressure column 227.

Higher pressure column 217 may operate at pressures up to 100 psia and lower pressure column 227 at pressures up to 25 psia. The columns could be operated at higher pressures if desired; for example higher pressure column 217 could be operated in the pressure range of 100 to 180 psia, preferably 120 to 150 psia.

Sidestream vapor 251 enriched in argon and oxygen is withdrawn from the lower pressure column and introduced into argon rectification column 253 for recovery of argon. The other portion 248 of crude liquid oxygen 245 is flashed and used to provide cooling for condensation of enriched argon overhead vapor from argon column 253. The condensate provides reflux to argon column 253 and enriched argon product 255 which contains from about 1 ppmv to about 3 vol % oxygen. After providing cooling for argon overhead condensation, crude oxygen streams 257 and 259 are introduced into lower pressure column 227.

Low pressure nitrogen product 261 is warmed in exchangers 233, 211, and 209 and the warmed nitrogen 262 is compressed in compressor 263 to yield compressed nitrogen 265 at a pressure sufficient to be combined with fuel 267 and introduced into combustor 269. Optionally, a portion 264 of the nitrogen product is withdrawn for external use or vented. Combustion turbine air compressor 271 provides compressed air 273 at a pressure abov about 180 psia to support combustion in combustor 269, which generates hot combustion gas 275 which is expanded in combustion expansion turbine 277. Work from expansion turbine 277 drives compressor 271 and electric generator 279. Combustor 269, compressor 271, expansion turbine 277, and generator 279 are key components in an IGCC system; another key component is the gasification process (not shown) which generates fuel 267.

Liquid oxygen product 281 at a purity above 98 vol %, preferably greater than 99 vol %, and most preferably greater than 99.5 vol % is withdrawn from the bottom of lower pressure column 227, warmed in reboiler-condenser 213, exchanger 211, and exchanger 209, and compressed in product compressor 282 to provide high purity pressurized gaseous oxygen product 283. Oxygen product 283 is used in a gasification process (not shown) to generate fuel 267 by gasification of carbonaceous materials such as coal, petroleum coke, heavy oil, and the like. Optionally, liquid oxygen product 285 is withdrawn for export. High pressure nitrogen 287 is withdrawn from higher pressure column 217 and warmed in exchangers 211 and 209 to provide high pressure gaseous nitrogen product 289.

Figure 3:
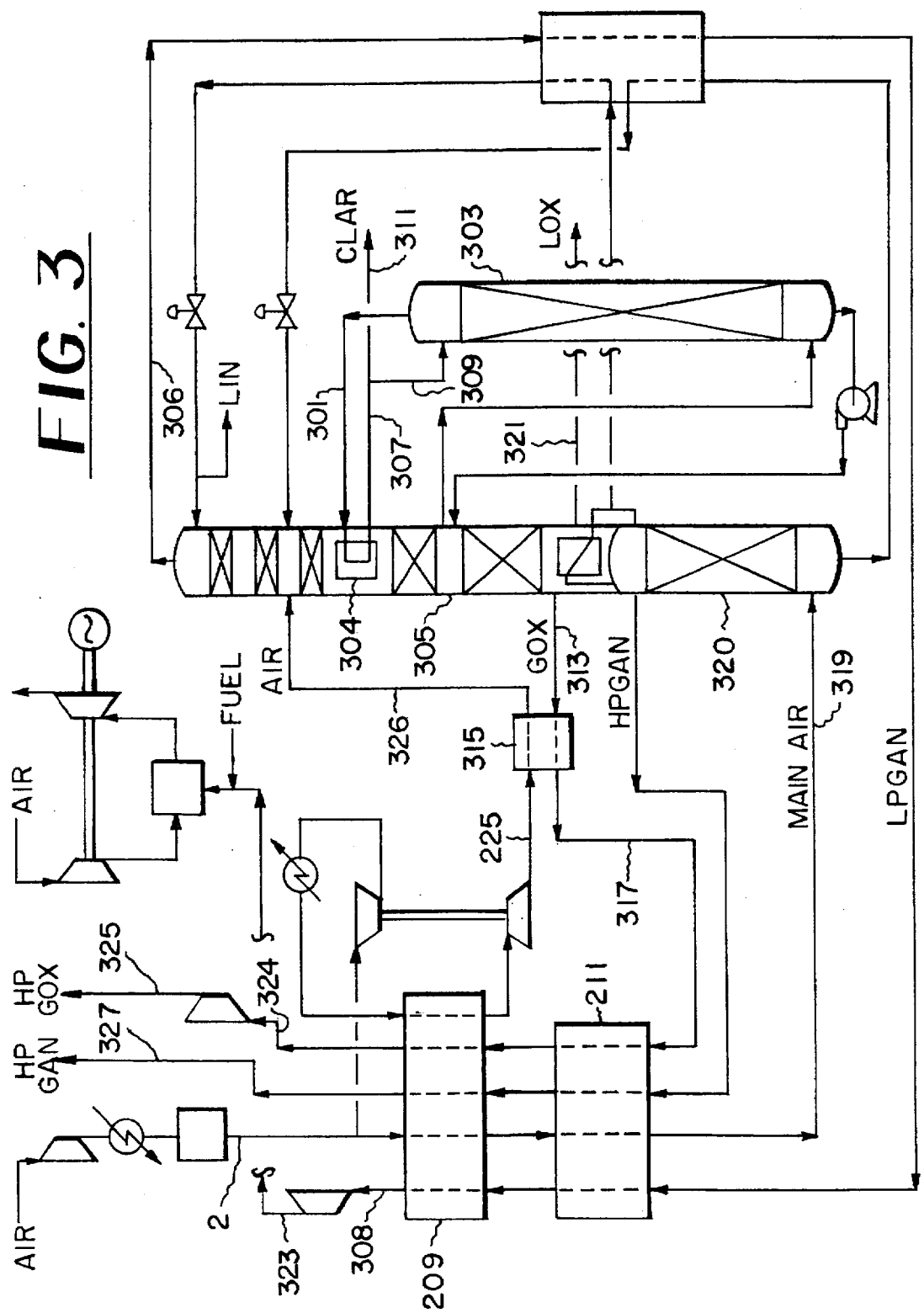
FIG. 3 is an alternative air separation system with argon recovery integrated with an IGCC system.

An alternative embodiment of the invention is given in FIG. 3. The feed air system, feed/product heat exchangers, air expander refrigeration system, oxygen and nitrogen products, and combustion turbine system are identical to those of FIG. 2. The distillation system differs from that of FIG. 2 in several major features. The first of these is that the air separation process in FIG. 3 is an elevated pressure process which means by definition that the higher pressure column operates above 100 psia and the lower pressure column operates above 25 psia. Another difference is that the overhead vapor 301 from argon recovery column 303 is condensed in heat exchanger 304 located in lower pressure column 305 by heat exchange with vaporizing liquid at that point in the column. Condensate 307 provides reflux 309 to argon recovery column 303 and crude argon product 311. Minor differences include the withdrawal of gaseous oxygen 313 which is warmed against cooling air feed 225 in exchanger 315 and further warmed in exchangers 211 and 209 as previously described. In addition, main air feed 319 is not cooled against vaporizing liquid oxygen product, and liquid oxygen product 321 is withdrawn as required. The process of FIG. 3 has the advantage over the process of FIG. 2 in that it provides increased argon recovery.

Since argon is recovered in the air separation processes described above, the oxygen products 283 and 325 generally are recovered at a purity above 99.5 vol % oxygen. This is significantly higher than the oxygen purity typically obtained when argon is not recovered, which purity is below 98 vol % and often below 95 vol % oxygen. Operators of IGCC systems typically specify a nominal oxygen purity of 95 vol % (which may vary from 80 to 98 vol %). When liquid oxygen product is pumped to an elevated pressure and vaporized in brazed aluminum heat exchangers, such as for example exchangers 209 and 211, air separation plant owners or manufacturers may wish to avoid operation at high oxygen purities when such purities are higher than actual product requirements. This is because the probability of metal ignition when using aluminum heat exchangers, although very low, increases at very high oxygen purity, especially at higher pressures.

Figure 4:
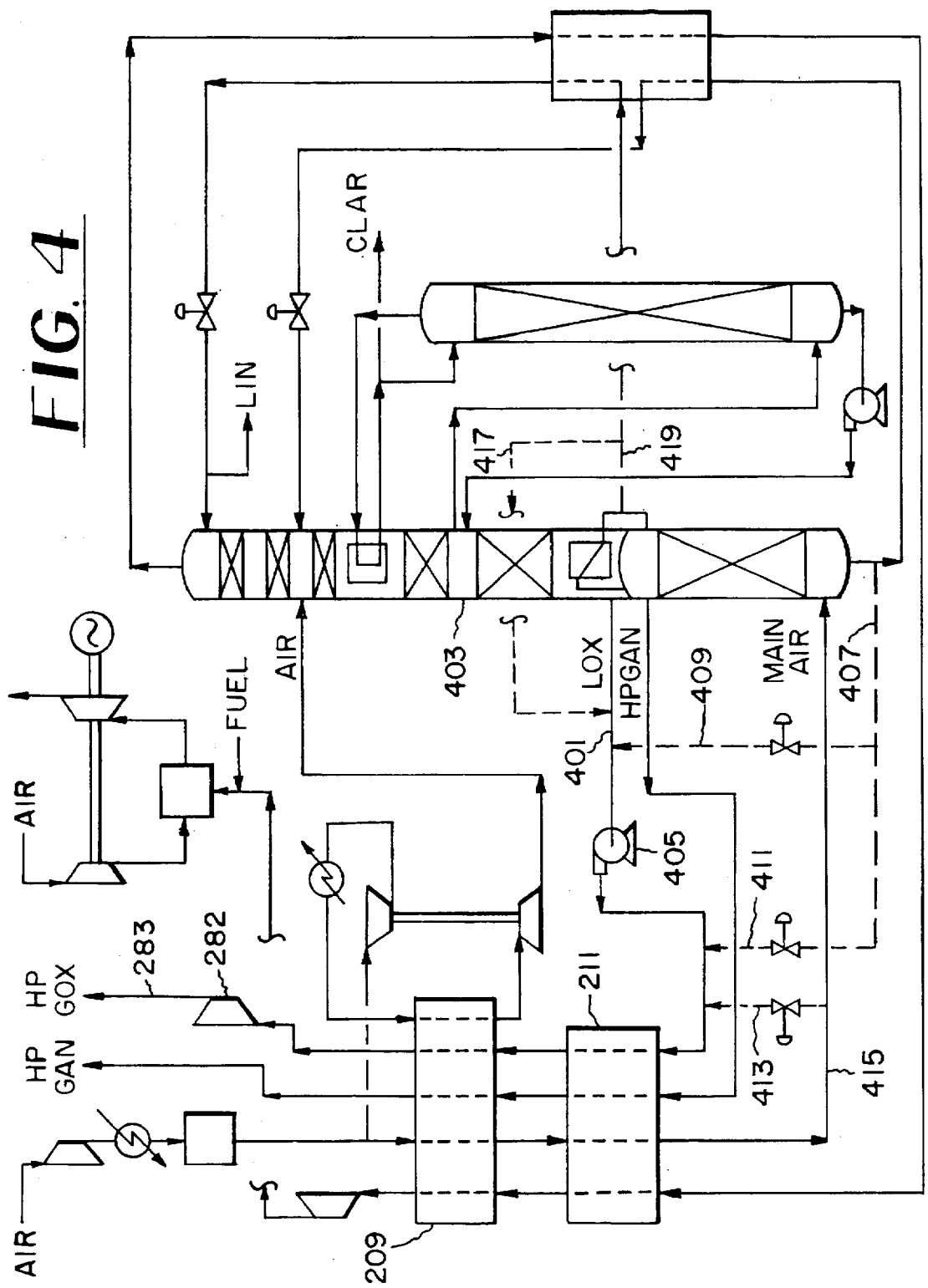
FIG. 4 is a modification of the alternative air separation system with argon recovery of FIG. 3 integrated with an IGCC system.

Since high pressure oxygen products 283 or 325 may be provided at pressures up to 1000 psig or more, it may be advantageous to reduce the oxygen purity of liquid oxygen prior to vaporization in exchangers 211 and 209 and optional compression in compressor 282. This is accomplished in another embodiment of the invention as illustrated in FIG. 4.

In one mode of the operation, high purity liquid oxygen product 401 from lower pressure column 403 is pressurized in pump 405 to the desired pressure before vaporization in exchangers 209 and 211 to reduce the power requirement of compressor 282. In this embodiment of the invention, high purity liquid oxygen 401 is reduced in purity to less than 99.5 vol % oxygen by blending with a process stream having a lower oxygen concentration. This process stream may be obtained from any source in the air separation process as long as the oxygen concentration is sufficiently low for dilution purposes. In one application, crude liquid oxygen 407 containing about 65 vol % nitrogen plus argon is blended with liquid oxygen product 401 before or after pump 405 as stream 409 or 411 respectively. Alternatively, portion 413 of cooled air feed 415 is blended with the high pressure oxygen prior to heat exchangers 211 and 209. Also, a portion of 417 of liquid nitrogen stream 419 can be used for dilution prior to pump 405. While the dilution of high purity oxygen product is described here for the specific air separation process of FIGS. 3 and 4, the dilution embodiment can be used in any air separation process integrated with an IGCC system.

Figure 5:
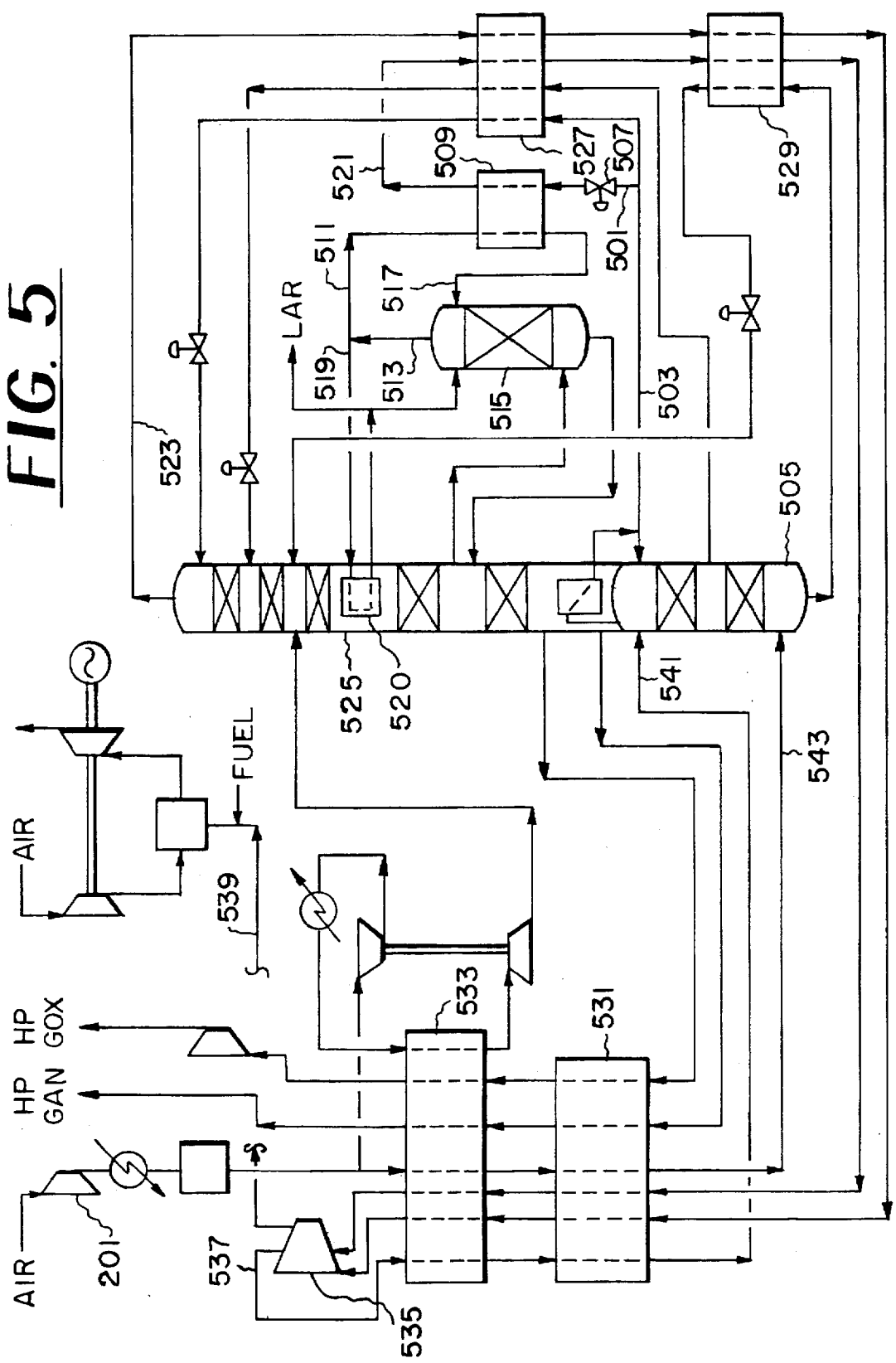
FIG. 5 another alternative air separation system with argon recovery integrated with an IGCC system.

An alternative embodiment of the invention is given in FIG. 5. The feed air system, feed/product heat exchangers, air expander refrigeration system, oxygen and nitrogen products, and combustion turbine system are identical to those of FIG. 3. The distillation system of FIG. 5 similar to that of FIG. 3 but includes two additional important features. In the first of these features, a portion 501 of nitrogen 503 from higher pressure column 505 is flashed across throttling valve 507 and the flashed stream is introduced into heat exchanger 509, which condenses portion 511 of argon overhead 513 from argon recovery column 515. Condensed argon 517 is returned as reflux to column 515. The remaining portion 519 of argon overhead vapor 513 is condensed in condenser 520 as earlier described with reference to FIG. 3.

Nitrogen product 523 from the top of lower pressure column 525 is warmed against cooling process streams in heat exchangers 527, 529, 531, and 533, and the warmed nitrogen is compressed in multi-stage compressor 535. A portion 539 of the compressed nitrogen from compressor 535 is introduced into the IGCC combustor as earlier described with reference to FIG. 2. The remaining nitrogen 537 from the compressor interstage discharge is cooled in heat exchangers 533 and 531 and is introduced into higher pressure column 505. Partially warmed nitrogen 521 from heat exchanger 509 is further warmed in heat exchangers 527, 529, 531, and 533, and is introduced at an interstage location of compressor 535. Thus nitrogen streams 537 (returned to higher pressure column 505) and 539 (introduced into the IGCC combustor) contain nitrogen from both higher pressure column 505 and lower pressure column 523.

Other variations of the process of FIG. 5 are possible to improve the overall air separation process efficiency. For example, any of the air separation processes described in U.S. Pat. No. 5,255,522, the specification of which is incorporated herein by reference, can be utilized in the present invention. In other alternative modes of operation, other heat pump cycles can be used such as those disclosed in U.S. Pat. Nos. 5,245,831, and 5,255,524 cited earlier, the specifications of which are incorporated herein by reference. In one variation, nitrogen 521 from heat exchanger 509 (which condenses argon overhead vapor 511) is warmed in exchangers 527, 529, 531, and 533 as before, but the warmed nitrogen is compressed in a separate compressor (not shown), cooled in exchangers 533 and 531, reduced in pressure if necessary, and introduced into higher pressure column 505 in one mode of heat pumping. Multistage compressor 535 is not used, and instead nitrogen 523 from lower pressure column 525 is warmed as described above in exchangers 527, 529, 531, and 533, is compressed in a separate compressor (not shown), and is introduced into the IGCC combustor as earlier described.

Another variation utilizes a portion of argon overhead vapor 511 as a heat pump fluid wherein the argon is warmed in exchangers 527, 529, 531, and 533, compressed, cooled in exchangers 533 and 531, further cooled indirectly against boiling liquid oxygen in the bottom of lower pressure column 525, flashed, and returned to the top of argon recovery column 515.

In another variation, a portion of feed air 543 is further cooled against liquid oxygen from the bottom of lower pressure column 525, the further cooled air is flashed to provide the cooling duty for argon condensing heat exchanger 509, the resulting air is warmed in exchangers 527, 529, 531, and 533, and the resulting warmed air is introduced at an interstage location in main air compressor 201 to complete a heat pump circuit.

All embodiments of the invention described above have the common feature that air feed to the air separation process and combustion air for the combustion turbine are provided in separate compression steps which utilize separate compressors 201 and 271 of FIG. 2. This is a preferred method of operation for reasons earlier described. A separate and independent air supply for the air separation process ensures operating flexibility and the ability to operate the air separation process at optimum efficiency in recovering argon as well as oxygen and nitrogen.

EXAMPLE 1

A process simulation was carried out for the process of FIG. 2 including heat and material balance calculations to illustrate the operation of a low pressure air separation cycle with argon production which provides pressurized nitrogen and oxygen products to a system. The process operates higher pressure column 217 at a feed pressure of 83.6 psia and the lower pressure column at a feed pressure of 19.4 psia. The process separates feed air 1 to provide 212 lb moles/hr of argon product 255 for external use, 24,160 lb moles/hr of compressed nitrogen 265 at 270 psia to combustor 269, and 6,492 lb moles/hr of high pressure oxygen 283 at 1000 psia and a purity of 99.95 mole % which is used in a gasifier (not shown) to produce fuel 267. Separate high purity nitrogen product 289 is provided at 75 lb moles/hr and 78.6 psia. Argon recovery is 73% based on feed air 207. A summary of the stream conditions for Example 1 is given in Table 1.

EXAMPLE 2

A process simulation was carried out for the process of FIG. 3 including heat and material balance calculations to illustrate the operation of an elevated pressure air separation cycle with argon production which provides pressurized nitrogen and oxygen products to a IGCC system. The process operates higher pressure column 320 at a feed pressure of 124 psia and lower pressure column 305 at a feed pressure of 33.5 psia. The process provides argon product 311, compressed nitrogen 323, high pressure oxygen 325, and high purity nitrogen product 327 at the same flow rates and purities as the corresponding streams of Example 1. The argon product pressure of 33.9 psia is higher than the corresponding stream in Example 1 because lower pressure column 305 operates at a higher pressure. The pressures of all other product streams are identical to those of Example 1. A summary of the stream conditions for Example 2 is given in Table 2.

TABLE 1

Stream Summary for Example 1 (FIG. 2)

| Stream Number | Temp (Deg. F.) | Pressure (Psia) | Flow (Lbmol/hr) | Composition (Mol %) | | | |
|---|---|---|---|---|---|---|---|
| | | | | $N_2$ | Ar | $O_2$ | $H_2O$ |
| 1 | 80 | 14.7 | 32361 | 77.34 | 0.92 | 20.74 | 1.00 |
| 207 | 55 | 86.9 | 32031 | 78.12 | 0.93 | 20.95 | 0.00 |
| 215 | −281 | 83.6 | 30066 | 78.12 | 0.93 | 20.95 | 0.00 |
| 225 | −260 | 19.4 | 1966 | 78.12 | 0.93 | 20.95 | 0.00 |
| 255 | −297 | 19.8 | 212 | 0.00 | 99.80 | 0.20 | 0.00 |
| 261 | −316 | 18.0 | 25251 | 98.79 | 0.33 | 0.88 | 0.00 |
| 262 | 53 | 16.0 | 25251 | 98.79 | 0.33 | 0.88 | 0.00 |
| 265 | 259 | 270.0 | 24160 | 98.79 | 0.33 | 0.88 | 0.00 |
| 280 | 53 | 23.9 | 6492 | 0.00 | 0.05 | 99.95 | 0.00 |
| 283 | 250 | 1000.0 | 6492 | 0.00 | 0.05 | 99.95 | 0.00 |
| 281 | −290 | 25.9 | 6492 | 0.00 | 0.05 | 99.95 | 0.00 |
| 289 | 53 | 78.6 | 75 | 99.99 | 0.01 | 0.00 | 0.00 |

TABLE 2

Stream Summary for Example 2 (FIG. 3)

| Stream Number | Temp (Deg. F.) | Pressure (Psia) | Flow (Lbmol/hr) | Composition (Mol %) | | | |
|---|---|---|---|---|---|---|---|
| | | | | $N_2$ | Ar | $O_2$ | $H_2O$ |
| 1 | 80 | 14.7 | 31257 | 77.34 | 0.92 | 20.74 | 1.00 |
| 2 | 55 | 126.3 | 30937 | 78.12 | 0.93 | 20.95 | 0.00 |
| 306 | −308 | 30.9 | 24160 | 99.72 | 0.24 | 0.04 | 0.00 |
| 308 | 53 | 28.9 | 24160 | 99.72 | 0.24 | 0.04 | 0.00 |
| 311 | −287 | 33.9 | 211 | 0.00 | 99.80 | 0.20 | 0.00 |
| 313 | −280 | 36.4 | 6492 | 0.00 | 0.46 | 99.54 | 0.00 |
| 319 | −261 | 124.0 | 29394 | 78.12 | 0.93 | 20.95 | 0.00 |
| 323 | 223 | 270.0 | 24160 | 99.72 | 0.24 | 0.04 | 0.00 |
| 324 | 53 | 33.6 | 6492 | 0.00 | 0.46 | 99.54 | 0.00 |
| 325 | 235 | 1000.0 | 6492 | 0.00 | 0.46 | 99.54 | 0.00 |
| 326 | −240 | 33.5 | 1543 | 78.12 | 0.93 | 20.95 | 0.00 |
| 327 | 53 | 118.9 | 75 | 100.00 | 0.00 | 0.00 | 0.00 |

EXAMPLE 3

The power consumption for the air separation processes of Examples 1 and 2 were calculated and normalized for comparison as given in Table 3. It is seen that less power is consumed by the elevated pressure process of Example 2 than the conventional lower pressure process of Example 1.

TABLE 3

Relative Air Separation Power Consumption

| Compressor | Example 1 | Example 2 |
|---|---|---|
| Main Air (201) | 0.366 | 0.421 |
| Oxygen (282) | 0.176 | 0.158 |
| Nitrogen (263) | 0.458 | 0.353 |
| Total | 1.000 | 0.932 |

EXAMPLE 4

Additional process calculations were carried out to determine the effect of feed air pressure on relative air separation power consumption at a constant argon recovery of 73%. First, power consumption calculations for the process of Example 1 were carried out for a feed air pressure of 90 psia. Further power calculations were carried out at increasing feed pressure and it was determined that relative power could be reduced up to a pressure of about 110 psia if additional stages (trays or packing) were added in lower pressure column 227 and argon column 253. Above this pressure, increasing the number of additional trays is ineffective to maintain argon recovery at 73%.

In order to maintain argon recovery at 73% using higher pressure air feed, it is necessary to utilize the air separation process of FIG. 3 as illustrated in Example 2. power consumption calculations were carried out using the process of FIG. 3 for feed pressures of 120 and 130 psia. As in the calculations described above, argon recovery can be maintained as feed pressure is increased by increasing the number of stages in the lower pressure column 305 and argon column 302. When the feed pressure is increased above 130 psia, however, the number of additional trays required becomes impractical and another air separation process cycle must be considered. In this case, this alternative process cycle is that of FIG. 5.

The process of FIG. 5, as earlier described, utilizes a heat pump operating mode in which compressed nitrogen recycle stream 537 is cooled and returned to high pressure column 505. The heat pump mode allows the maintenance of argon recovery at 73% at pressures above about 140 psia. The relative power consumption at this argon recovery was calculated for the process of FIG. 5 at 140, 150, 160, and 170 psia for comparison with the power consumption calculated at lower air feed pressures as described above. As air feed pressure is increased, argon recovery is maintained by increasing the flow of recycle nitrogen 537, which increases the power consumption of compressor 535 and thus the total air separation power consumption.

The resulting calculated relative power consumption for these cycles and feed pressures are summarized in Table 4 and FIG. 6. It is seen for this Example that the minimum air separation power occurs in the approximate range of 130 to 150 psia air feed pressure and that the preferred air separation cycle is that of either FIG. 3 or FIG. 5. It should be noted that this minimum power range is a function of certain operating variables, and the location of this minimum power range will change slightly depending on these variables. For example, at a different argon recovery the location of the minimum and the value of the minimum power would change slightly.

Based on the results given in FIG. 6, it is concluded that the air feed pressure should be above about 100 psia and below about 180 psia, preferably between 120 and 160 psia, and most preferably between 120 and 150 psia.

TABLE 4

Comparison of Relative Air Separation Power Consumption as a Function of Feed Air Pressure (73% Argon Recovery)

| Air Separation Process Cycle | Air Feed Pressure, psia | Relative Power |
|---|---|---|
| FIG. 2 | 90 | 1.000 |
| FIG. 3 | 120 | 0.935 |
| FIG. 3 | 130 | 0.932 |
| FIG. 5 | 140 | 0.929 |
| FIG. 5 | 150 | 0.935 |
| FIG. 5 | 160 | 0.941 |
| FIG. 5 | 170 | 0.952 |

This Example illustrates that for a given argon recovery there exists a preferred air feed pressure range in which the air separation power consumption is a minimum. This preferred feed pressure range will be significantly lower than the discharge pressure of combustion turbine air compressor 271, which is typically above about 180 psia. The air separation process cycles of FIG. 3 and FIG. 5 are preferred, and the actual cycle selection will be determined by required argon recovery and project-specific process economics. The alternative heat pump cycles described earlier with reference to FIG. 5 also can be selected as required.

Thus the present invention teaches the benefits of operating an air separation process with argon recovery integrated with an IGCC power generation system wherein the air feed to the air separation process is provided separately and independently from the compressed combustion air to the IGCC system. This process arrangement allows independent operation of the air separation process in a preferred pressure range which is lower than the pressure of IGCC combustion turbine air so that the power consumption of the air separation process can be minimized. A separate and independent air supply for the air separation process ensures operating flexibility and the ability to operate the air separation process at optimum efficiency in recovering argon, oxygen, and nitrogen.

The essential characteristics of the present invention are described completely in the foregoing disclosure. One skilled in the art can understand the invention and make various modifications without departing from the basic spirit of the invention, and without deviating from the scope and equivalents of the claims which follow.

We claim:

1. In a process for the generation of power in an integrated gasification combined cycle power generation system, wherein a compressed air feed is separated in a cryogenic distillation system at elevated pressure to recover oxygen and nitrogen, at least a portion of the oxygen is used in the gasification of a carbonaceous feedstock to provide a combustible gas mixture, and at least a portion of the gas mixture is combusted with compressed combustion air in a gas turbine combustor to generate hot pressurized gas which is expanded in a gas turbine which drives an electric generator to generate electric power, the improvement which comprises recovering an argon product in combination with the recovery of oxygen and nitrogen, wherein the compressed air feed for the cryogenic distillation system and the compressed combustion air for the gas turbine combustor are supplied by separate compression steps, and wherein the oxygen, nitrogen, and the argon product are recovered in a multiple column distillation process which comprises:

a) cooling the compressed air feed and separating the resulting cooled feed in a higher pressure column to yield a bottoms stream enriched in oxygen and argon;

b) cooling the bottoms stream, reducing the pressure of the resulting cooled stream, and introducing the resulting cooled reduced pressure stream into a lower pressure column;

c) withdrawing a high purity oxygen product which contains greater than 98 vol % oxygen from the bottom of the lower pressure column and an argon-enriched vapor from an intermediate point in the lower pressure column; and d) introducing the argon-enriched vapor into an argon recovery distillation column, withdrawing and condensing a further argon-enriched overhead vapor therefrom, utilizing a portion of the resulting condensate as reflux for the column, and withdrawing the remaining portion of the condensate as an enriched argon product;

wherein boilup in the lower pressure column is provided in total by indirect heat exchange with vapor from the higher pressure column, and wherein feed to the higher pressure column is provided from the cooled feed of step a) without additional compressed vapor recycled from other points in the multiple column distillation process.

2. The process of claim 1 wherein the compressed air feed for the cryogenic distillation system is provided at a pressure above about 100 psia and below about 180 psia.

3. The process of claim 2 wherein the compressed air feed for the cryogenic distillation system is provided at a pressure between about 120 and about 160 psia.

4. The process of claim 1 which further comprises introducing at least a portion of the nitrogen directly into the gas turbine combustor.

5. The process of claim 1 wherein the argon recovery is at least 30% based on the compressed air feed to the cryogenic distillation system.

6. The method of claim 1 which further comprises thermally integrating the lower pressure and higher pressure columns and the argon recovery column by condensing a nitrogen overhead vapor from the higher pressure column against liquid oxygen boiling in the bottom of the lower pressure column, using a portion of the resulting condensed nitrogen as reflux in the higher pressure column, and using another portion of the resulting condensed nitrogen to provide by indirect heat exchange a portion of the cooling duty for condensing the overhead vapor from the argon recovery column, thereby yielding a partially warmed nitrogen stream.

7. The method of claim 6 which further comprises withdrawing a nitrogen vapor product from the top of the lower pressure column, warming the nitrogen vapor product, and compressing the resulting warmed nitrogen vapor product to provide the nitrogen which is introduced into the gas turbine combustor.

8. The method of claim 1 wherein the high purity oxygen product is withdrawn from the bottom of the lower pressure column as a liquid, the liquid is pumped to yield pressurized liquid oxygen, and the pressurized liquid oxygen is warmed, vaporized, and optionally further compressed to provide a high purity pressurized oxygen gas product.

9. The method of claim 8 which further comprises blending a stream having a lower oxygen concentration with the high purity oxygen product prior to vaporization, thereby reducing the purity of the high purity pressurized oxygen gas product.

10. The method of claim 9 wherein the stream having a lower oxygen concentration is a portion of the bottoms stream from the higher pressure column, and wherein blending is carried out prior to pumping.

11. The method of claim 9 wherein the stream having a lower oxygen concentration is a portion of the bottoms stream from the higher pressure column, and wherein blending is carried out following pumping.

12. The method of claim 9 wherein the stream having a lower oxygen concentration is a portion of the cooled feed air prior to the higher pressure column, and wherein blending is carried out following pumping.

13. The method of claim 9 wherein the stream having a lower oxygen concentration is a portion of liquid nitrogen withdrawn from the higher pressure column, and wherein blending is carried out before pumping.

14. The method of claim 1 wherein at least a portion of the cooling for condensing the argon-enriched overhead vapor is achieved by indirect heat transfer with fluid from an intermediate point in the lower pressure column.

15. The process of claim 1 which further comprises combining at least a portion of the nitrogen with the combustible gas prior to the gas turbine combustor.

* * * * *